(12) United States Patent
Andre

(10) Patent No.: US 8,370,004 B2
(45) Date of Patent: Feb. 5, 2013

(54) CONTROL PANEL FOR AN AIRCRAFT

(75) Inventor: Raphaël Andre, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 161 days.

(21) Appl. No.: 13/098,616

(22) Filed: May 2, 2011

(65) Prior Publication Data

US 2011/0270471 A1 Nov. 3, 2011

(30) Foreign Application Priority Data

May 3, 2010 (FR) ...................................... 10 53409

(51) Int. Cl.
*G05D 1/00* (2006.01)
(52) U.S. Cl. .............................................. 701/3; 701/14
(58) Field of Classification Search .................. 701/3, 4, 701/11, 14, 12, 15, 16; 340/945, 963, 971
See application file for complete search history.

(56) References Cited

U.S. PATENT DOCUMENTS

2005/0065669 A1 3/2005 Roux et al.
2008/0129475 A1* 6/2008 Breed et al. .................... 340/438

FOREIGN PATENT DOCUMENTS

| DE | 10065907 | 9/2002 |
|----|----------|--------|
| FR | 2858863 | 2/2005 |
| WO | 9813667 | 4/1998 |
| WO | 2004037643 | 5/2004 |

OTHER PUBLICATIONS

French Patent Office, International Search Report FR 1053409 (2 pgs.), Dec. 10, 2010.

* cited by examiner

*Primary Examiner* — Richard M. Camby
(74) *Attorney, Agent, or Firm* — Wood, Herron & Evans, LLP

(57) ABSTRACT

The control panel (1) comprises two chains (A, B) of signal acquisition, digitization and processing, which are redundant and which include means (7) for performing crosschecks.

10 Claims, 2 Drawing Sheets

CONTROL PANEL FOR AN AIRCRAFT

Figure 1:
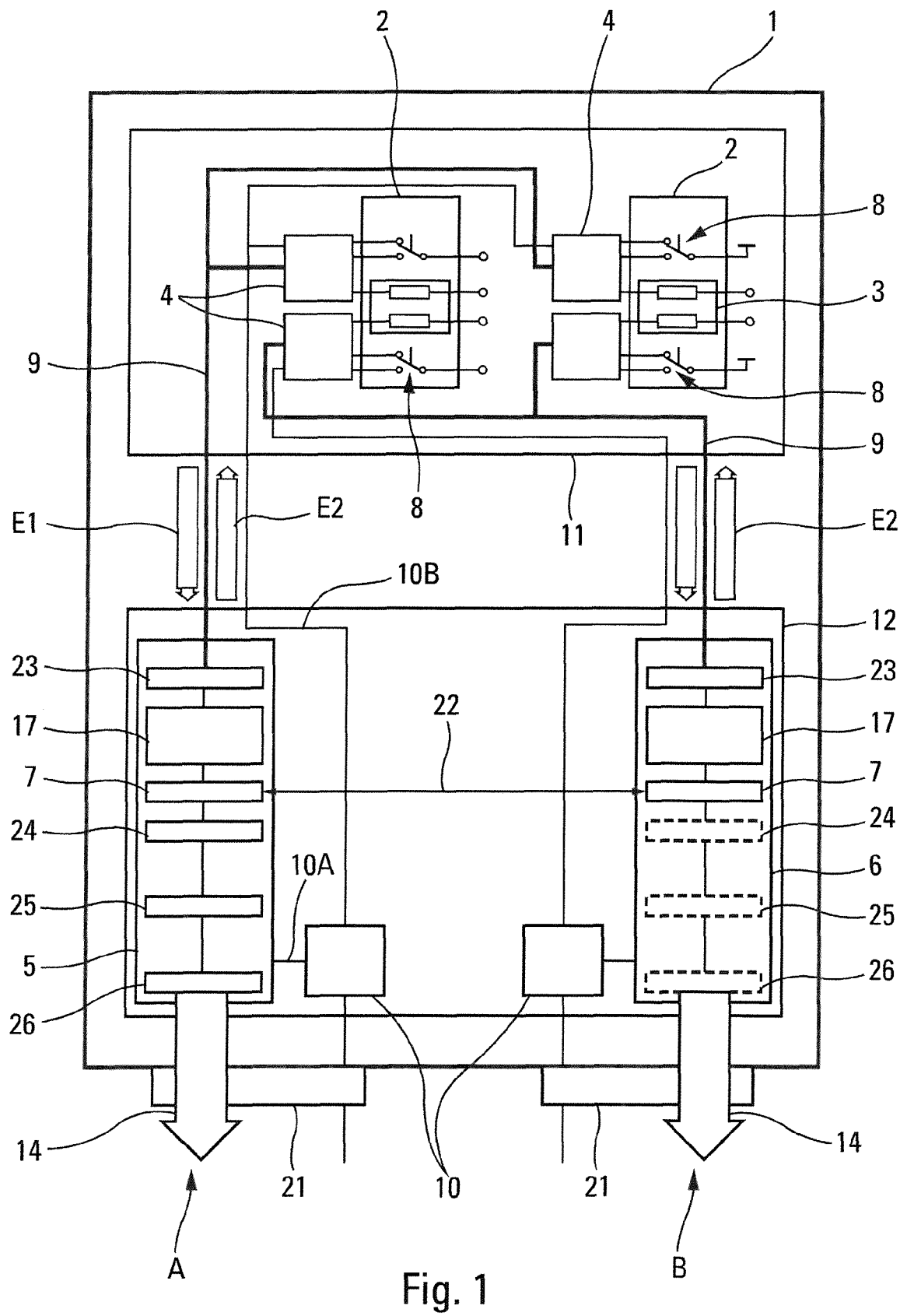

The present invention relates to a control panel for an aircraft, in particular for a transport airplane.

Such a control panel being, for example, arranged in the cockpit of the aircraft, generally comprises a plurality of control means (push buttons, rotary switches, potentiometers, etc.) being able to be actuated by an operator, including by the pilot of the aircraft, in order to control equipment of said aircraft.

From document FR-2, 858, 863, such a control panel is known, being part of a control system of an aircraft. Such a control system comprises, in addition to said panel, a plurality of controllable equipment (air conditioning, de-icing means, etc.) of the aircraft, each of which is controlled by a computer being associated therewith, as a function of the actuation of an also associated control member of said control panel, and a communication system for connecting together the computers and the associated control members.

Different technologies are known for manufacturing such a control panel.

According to an ancient simple and robust technology, the control members are connected by electric wires to the controllable equipment, for example pumps or engines. For safety reasons, such control panels are able to process critical functions thanks to various characteristics including:
  a segregation between all switches of the control panel, allowing common breakdowns to be avoided; and
  multiple electrically independent switching cells corresponding to different stages of such switches, mechanically connected together in a same control member.

In the scope of the present invention, a function is considered as critical if its deficiency is likely to have severe consequences on the safety of the aircraft.

Such a simple and robust architecture, however, has a major drawback: it requires more particularly a large number of electric wires, resulting in weight, bulk, cost, and installation problems.

In order to remedy such a drawback, a recent technology provides digitizing switch signals and transmitting the condition of the control members to the systems via digital data transmission buses. Such a solution leads to electronic components being integrated into the control panel. The internal architecture of the panel is then modified so as to use printed circuit boards, rather than electric wires.

As an illustration, from the above mentioned document FR-2,858,863, a control system for an aircraft is known, wherein the communication system comprises digital communication buses connecting the control panels to the equipment to be controlled. Such digital communication buses are CAN buses or switched simultaneous bidirectional Ethernet networks, of the AFDX type ("Avionics Full Duplex Switched Ethernet").

However, such a new architecture is dedicated to data with a low level of criticality, and this for several reasons:
  the communication is based on digital communication buses that were not used previously on airplanes. Now, the certification bodies require convincing operational experiments before authorizing a new technology for critical functions of an airplane; and
  there is no monitoring means being provided for securing the integrity of the digital chain.

Thus, even in such new architectures, the ancient characteristics with transmissions of discrete or analog signals using electric wires, are generally dedicated to the critical functions, for example those relating to the flight controls.

The present invention relates to a control panel for an aircraft, allowing the above mentioned drawbacks to be remedied.

To this end, according to the invention, said control panel, of the type comprising a plurality of members comprising control members (push buttons, rotary switches, potentiometers, etc.) being able to be actuated by an operator (and optionally indication members such as an indicator light for example), as well as control signal acquiring and digitizing means, wherein a control signal, being generated by a control member being actuated and being transmitted by said control panel, is intended for controlling a controllable equipment of the aircraft, is remarkable in that it comprises:
  two chains for acquiring, digitizing and processing signals, which are present in the control panel, being integrated into said control panel, being redundant at any level and being segregated, the signals present in the control panel comprising at least said control signals; and
  two monitoring units for said signals, each of which is part of one of said two chains and comprising means for performing crosschecks.

Thus, thanks to the full redundancy at all levels (switches, data acquisition means, local communication buses, sources of energy, etc.) of both signal acquisition, digitization and processing chains, and to the implementation of crosschecks (to be described below) that are performed between the signals or data present on the two chains, it is possible to check the integrity of all those signals.

Thus, as thanks to such characteristics, it is possible to know, at any moment, for all the signals able to transit on the control panel, and in particular for critical signals, whether they are integrated or not, said control panel according to the invention could also be used for processing such critical signals. Thus, it is not necessary to provide specific means such as electric wire links for such critical signals, which offers a lot of advantages, including in terms of weight and bulk.

Thus, thanks to this invention, a control panel is achieved, provided with a fully digital data transmission system, being able to process any type of signal or data.

Moreover, as described below, the control panel according to this invention could be achieved, more specifically, from any type of switch and/or any type of digital bus.

It could be provided that monitoring units only check part of the signals being present in the control panel, in particular the outcoming signals, essentially said control signals, or the incoming signals such as control orders for panel members, for example, light indicators. However, in a preferred embodiment, said monitoring units are formed so as to check all the signals being present in the control panel.

Advantageously, said means intended for performing the crosschecks compare, bit to bit, two corresponding signals being transmitted respectively by both signal acquisition, digitization and processing chains.

In a particular embodiment, said control panel further comprises means for checking the consistency of signals that are associated with a member of said control panel, either to a control member (push-button, rotary switch, potentiometer, etc.), or to an indicating member such a light indicator, for example. Preferably, such a consistency is checked comparing two data relative to the relevant member, for example the two positions of a switch, or an order and a current being measured on an indicator. Moreover, said means for checking the consistency of signals could be integrated, either into the digitization means, or into a checking unit.

Furthermore, when data are detected as being invalid by such a consistency being checked on one of said chains, either the processing can be continued with the corresponding data or signals existing on the other chain, or it could be considered that the member at the origin of such data is defective.

In a particular embodiment, said control panel further comprises means, for example a light indicator, for indicating, the case being, on the control panel the detection of an invalid signal upon such a monitoring. Thus, the pilot can be informed about any deficiency affecting a member of the control panel.

Furthermore, said control panel further comprises:
means for, should an invalid signal be detected, implementing one of the following operations:
stopping the transmission of such a signal;
transmitting rather a default signal;
transmitting instead the last valid signal; and/or
means for generating a digital signature (of the <<checksum>> type) of a control signal and for completing the transmission of said control signal with such a digital signature.

Moreover, in a preferred embodiment, said control panel comprises two electronic boards, i.e. one front board and one interface board, being connected together by local data transmitting buses. Furthermore, said front board comprises said members and said control signal acquiring and digitizing means, and said interface board comprises said monitoring units, as well as sources of energy.

Moreover, advantageously, said control panel could also comprise one or more external communication interfaces.

The present invention also relates to an aircraft system comprising a control panel (provided with a plurality of control members being able to be actuated by an operator) and a plurality of controllable equipment being connected to said control panel via data transmitting means. According to this invention, said control panel is such as mentioned hereinabove.

In addition, the present invention further relates to an aircraft, in particular a transport airplane, comprising a control panel and/or a system such as mentioned hereinabove.

The FIGS. of the appended drawing will better explain how this invention can be implemented. In these FIGS., like reference numerals relate to like components.

FIG. 1 is a block diagram of a control panel according to this invention.

Figure 2:
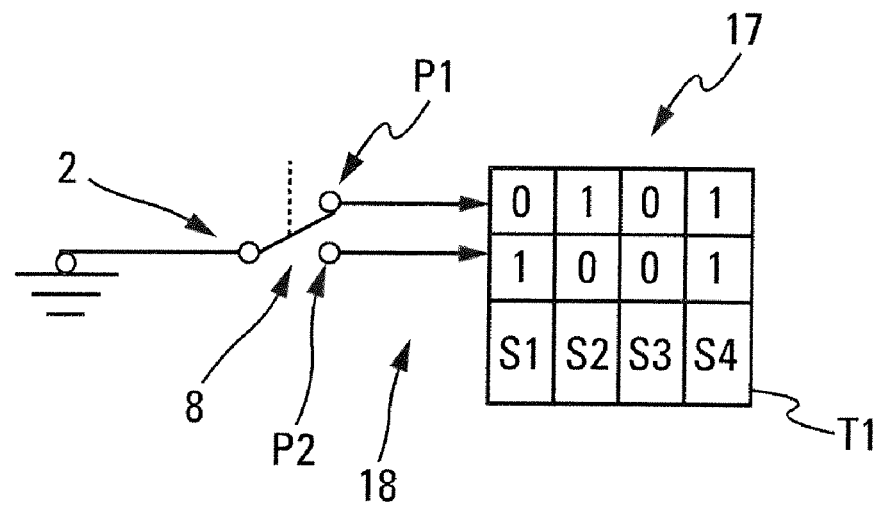
Figure 3:
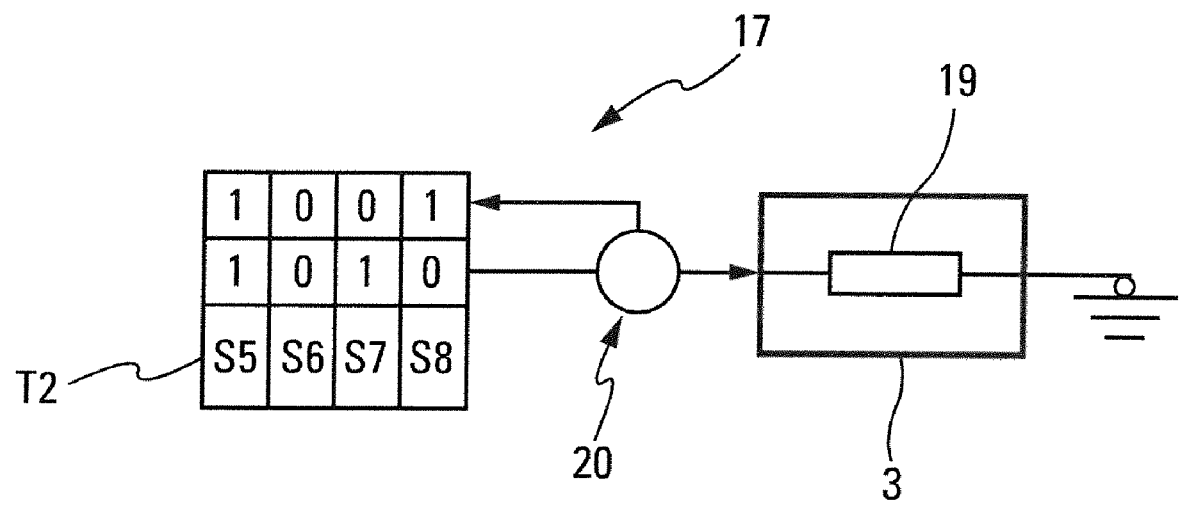

FIGS. 2 and 3 schematically illustrate means for checking the consistency of signals being associated respectively with a control member and an indicating member.

The control panel 1 according to this invention and schematically represented on FIG. 1, is arranged on a non shown aircraft, in particular a civil transport airplane, and acts as a man/machine interface with a view to controlling controllable equipment (not shown) of such an aircraft, such as signaling indicators for the passengers' cabin (for example a "forbid to smoke" signaling), an air conditioning, de-icing means, pumps, valves, etc.

To this end, said control panel 1 comprises a plurality of members comprising control members 2 (push buttons, rotary switches, potentiometers, etc.) being able to be actuated by an operator, and indicating members 3 such as a light indicator. Said control panel 1 further comprises control signal acquiring and digitizing means 4.

In the scope of the present invention, it is considered that a control signal:
is generated by a control member 2 being actuated;
illustrates the condition of such a control member 2 (depressed or released for a push-button, for example) or of a component of the latter (switch, indicator);
is transmitted by the control panel 1; and
is adapted to control at least one controllable equipment of the aircraft.

Moreover, said control panel 1 could be part of a (not shown) control system of the aircraft, comprising, in addition to said control panel 1:
a plurality of controllable equipment of the aircraft, each of which is controlled as a function of an associated control member 2 of the control panel 1 being actuated; and
communication means (communication buses, connection means) for connecting together said equipment and said control panel 1.

According to the invention, said control panel 1 comprises:
two chains A and B for acquiring, digitizing and processing signals present in the control panel 1, being integrated into said control panel 1. Such chains A and B are redundant at all levels and are segregated; and
two units 5 and 6 for checking said signals, each of which is part of one of said two chains A and B and comprising means 7 for performing crosschecks.

The control panel 1 thus comprises a full duplication at all levels of the two signal acquisition, digitization and processing chains A and B, and in particular, as shown on FIG. 1, at the level:
of switches 8 being integrated into the control members 2, and allowing the condition (actuation or not) of the latter to be determined;
of the data acquiring means 4 being associated with the control members 2;
of local communication buses 9; and
of sources of energy 10.

Thanks to such a full redundancy at all levels as well as implementing crosschecks (to be described below) that are performed (by means 7) between the signals or data present on the two chains A and B, the control panel 1 is able to check the integrity of all signals occurring at the level of said panel 1.

Thus, as, thanks to such characteristics, it is possible to know at any moment for all signals being able to transit on the control panel 1, and in particular for critical signals, whether they are integrated or not, said control panel 1 according to this invention could also be used for processing such critical signals. As a result, it is not necessary to provide specific means, such as electric wire links for example, for the critical signals, which offers a lot of advantages, including in terms of weight and bulk.

Thus, thanks to this invention, a control panel 1 is achieved, provided with a fully digital data transmitting system being able to process any type of signal or data.

It can be envisaged that the monitoring units 5 and 6 only check part of the signals present in the control panel 1, in particular the outcoming signals, essentially said control signals issued from the control members 2, or the incoming signals such as control orders for indicating members 3 of the panel 1, for example, light indicators. However, in a preferred embodiment, said monitoring units 5 and 6 are formed so as to check the integrity of all signals present in the control panel 1.

In a preferred embodiment, said control panel 1 comprises two electronic boards 11 and 12, i.e. one frontal board 11 and one interface board 12 being connected therebetween by local data transmitting buses 9. Said local buses 9 allow data to be transmitted in both directions: from the front board 11 to the interface board 12 as illustrated by arrows E1, and conversely, as illustrated by arrows E2.

Moreover, said front board 11 comprises said members 2 and 3 and said control signal acquiring and digitizing means 4, i.e., more specifically, for the condition of switches 8 of the members 2. All control members 2 are connected together by two local redundant and segregated communication buses 9.

In addition, said interface board 12 comprises both redundant and segregated monitoring units 5 and 6, securing the data integrity checks and a link to external communication buses 14, as well as both sources of energy 10 electrically supplying the monitoring units 5 and 6 via links 10A and the means 4 via links 10B.

Consequently, when the control panel 1 is to be complemented or modified with new control members 2 for example, the appropriate modifications are simply to be performed on the front board 11, without having to modify the interface board 12, except optionally for minor software adaptations.

In addition, an external communication interface is used for communicating with user systems. Optionally, a second redundant interface may be employed for increasing the tolerance to breakdowns and the availability of the control panel 1.

In a particular embodiment, said control panel 1 comprises means 17 for checking the consistency of signals that are associated with a member of said control panel 2, either with a control member 2 (push-button, rotary switch, potentiometer, etc.), or with an indicating member 3 such as a light indicator. Preferably, such a consistency is checked comparing two data relative to the member being considered, as described below. Moreover, said means 17 for checking the consistency of signals could be integrated, either into digitization means 4, or into a monitoring unit 5, 6.

In a first alternative embodiment represented on FIG. 2, said means 17 are associated with a switch 8 of a control member 2. Such means 17 comprise a member 18 for comparing therebetween the values (1 in the case of a link and 0 in the case of the absence of a link) of the two positions or outlets P1 and P2 of the switch 8. Four situations S1, S2, S3, and S4, illustrated on a table T1 of FIG. 2, could occur for the switch 8, as a function of these values, such situations corresponding respectively to the following conditions for the switch 8:
 depressed for S1;
 released for S2; and
 invalid for S3 and S4.

When the member 18 meets one of these latter situations S3 and S4, it therefore detects an inconsistency.

Such a member 18 could be similarly applied to switches with more than two positions.

Two different voltage levels (for example the earth and 5 V) could be used as a reference upon the digitization for generating discrepancies and for being less sensitive to external disturbances or to breakdowns of the printed circuit board.

In a second alternative embodiment represented on FIG. 3, said means 17 are associated with an indicating member 3 of a control member 2, provided with a usual illumination means 19 (LED). Such means 17 comprise a member 20 containing means for comparing the current condition (measured current) to the controlled condition of said indicating member 3 (1 for activated and 0 for inactivated).

Four situations S5, S6, S7 and S8, illustrated on a table T2 of FIG. 3, could occur for the indicating member 3, as a function of these values, such situations corresponding respectively to the following conditions for the indicating member 3:
 on for S5;
 off for S6;
 light breakdown for S7; and
 conductor breakdown for S8.

When the member 20 meets one of these latter situations S7 and S8, it therefore detects an inconsistency.

Furthermore, when data have been detected as being invalid by such a consistency being checked, occurring on one of said chains A, B, either the processing can be continued with the corresponding data or signals existing on the other chain, or it could be considered that the member at the origin of such data is defective.

Furthermore, said means 7 for performing crosschecks are connected together via a link 22 and compare, bit to bit, two corresponding signals being transmitted respectively by both signal acquisition, digitization and processing chains A and B.

In a particular embodiment, said control panel 1 further comprises means, for example a light indicator 3, for indicating on the front board 11 that an invalid signal has been detected. Thus, the pilot can be informed about any deficiency affecting a member 2, 3 of the control panel 1.

Furthermore, said control panel 1 also comprises means 24 for, should an invalid signal be detected, implementing one of the following operations:
 for an outcoming signal (or data):
  stopping sending this signal;
  sending a predetermined default signal; or
  sending the last valid signal; and
 for an incoming signal (or data):
  stopping processing this signal;
  applying a predetermined default signal; or
  keeping the last valid signal.

The control panel 1 further comprises:
 serial interfaces 23 being integrated into said monitoring units 5 and 6;
 usual means 25 for generating a digital signature (of the <<checksum>> type) of a control signal and for completing the transmission of said control signal with such a digital signature;
 outlet interfaces 26; and
 connectors 21.

Said means 24, 25, and 26 could be optional on the monitoring unit 6, as illustrated by dashed lines on FIG. 1.

The control panel 1 according to this invention has a quite varied implementation. In particular:
 it can comprise any type of switch: electromechanical, optical or magnetic;
 it could be achieved with microprocessors and software or with logic devices of the ASIC or FPGA type;
 the internal bus could be of any type of local digital bus meeting aeronautic constraints: I2C, SMBus, RS422, RS485; and
 the external bus could also be of any type of digital bus meeting aeronautic constraints: AFDX, CAN, ARINC 429, MIL 1553.

The invention claimed is:

1. A control panel for an aircraft, said control panel (1) comprising a plurality of members (2, 3) comprising control members (2) being able to be actuated by an operator, as well as control signal acquiring and digitizing means (4), wherein a control signal, being generated by a control member (2) being actuated and being transmitted by said control panel (1), is intended for controlling a controllable equipment of the aircraft, said control panel (1) having a segregation and a redundancy,
 characterized in that it comprises:
  two acquiring, digitizing and processing chains (A, B) for signals being present in the control panel (1), being integrated in said control panel (1), that are segregated, and having a full redundancy at all levels; and
  two signal monitoring units (5, 6), each of which is part of one of said two chains (A, B) and comprising means (7)

for performing crosschecks of all signals being present in the control panel (1), the signals present in the control panel (1) comprising at least said control signals.

2. The control panel according to claim 1, characterized in that said control panel (1) has a full duplication, at the level:
of switches (8) integrated into the control members (2) and allowing the condition of the latter to be determined;
of data acquiring means (4);
of local communication buses (9); and
of sources of energy 10.

3. The control panel according to claim 1, characterized in that said means (7) for performing crosschecks compare, bit to bit, two corresponding signals being transmitted respectively by both signal acquisition, digitization and processing chains (A,B).

4. The control panel according to claim 1, characterized in that it comprises means (17) for checking the consistency of signals being associated to a member (2, 3) of said control panel (1).

5. The control panel according to claim 1, characterized in that it comprises means for indicating on the control panel (1) that an invalid signal has been detected upon checking.

6. The control panel according to claim 1, characterized in that it comprises means (24) for, should an invalid signal be detected, implementing one of the following operations:
stopping the transmission of such a signal;
transmitting a default signal; and
keeping the last valid signal.

7. The control panel according to claim 1, characterized in that it comprises means (25) for generating a digital signature of a control signal and for completing the transmission of said control signal with such a digital signature.

8. The control panel according to claim 1, characterized in that it comprises two electronic boards (11, 12), one front board (11) and one interface board (12), being connected together by local data transmission buses (9), in that said front board (11) comprises said members (2, 3) and said control signal acquisition and digitization means (4), and in that said interface board (12) comprises at least said monitoring units (5, 6).

9. The control panel according to claim 1, characterized in that it further comprises at least an external communication interface.

10. An aircraft system comprising a control panel (1) provided with a plurality of control members (2) being able to be actuated by an operator and a plurality of controllable equipment being linked to said control panel (1) via data transmission means,
characterized in that said control panel (1) is such as specified in claim 1.

* * * * *